March 8, 1932.    S. A. HORSTMANN    1,848,783
SUSPENSION SYSTEM FOR MOTOR CARS AND VEHICLES OF ALL KINDS
Filed April 12, 1930    2 Sheets-Sheet 1
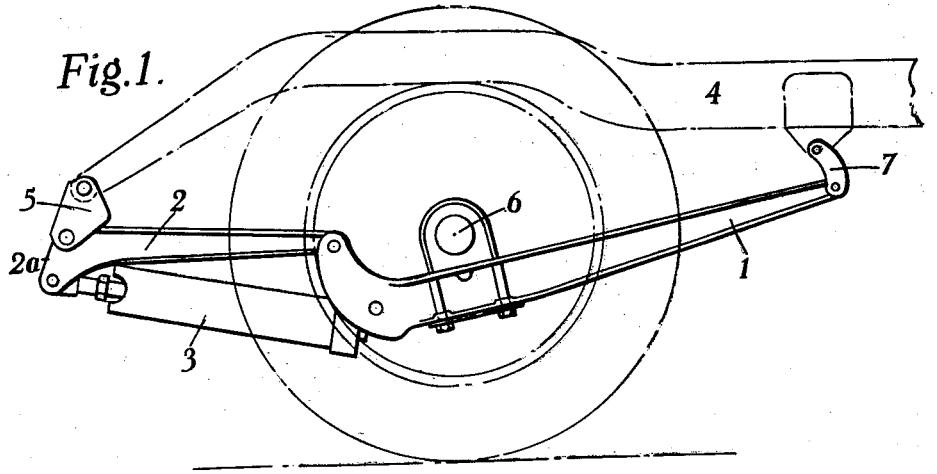
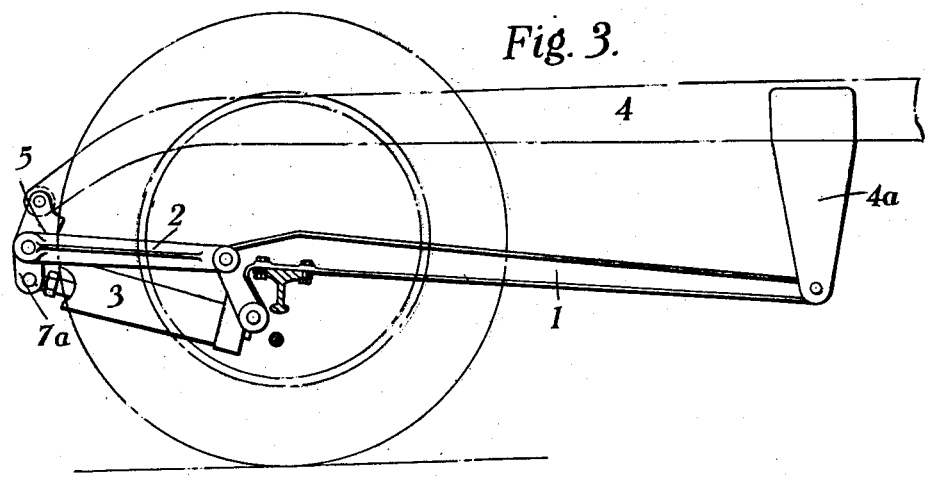
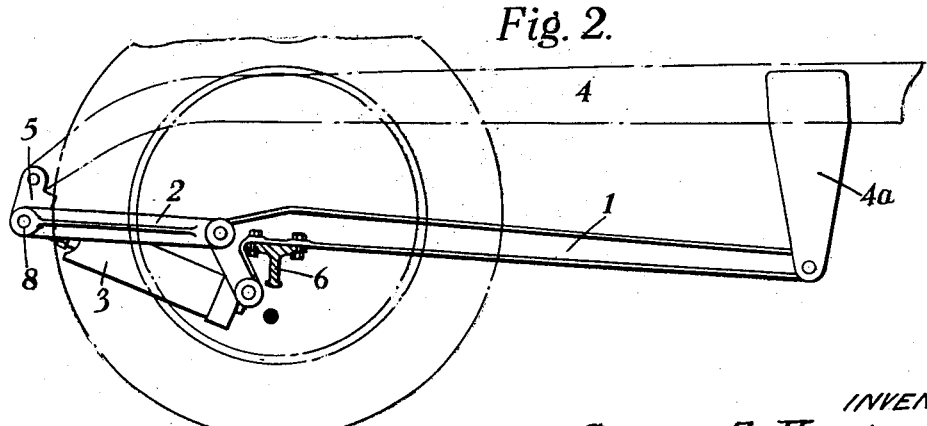
INVENTOR
Sidney A. Horstmann
BY
Ernest Wilkinson
ATTORNEY March 8, 1932.  S. A. HORSTMANN  1,848,783
SUSPENSION SYSTEM FOR MOTOR CARS AND VEHICLES OF ALL KINDS
Filed April 12, 1930  2 Sheets-Sheet 2
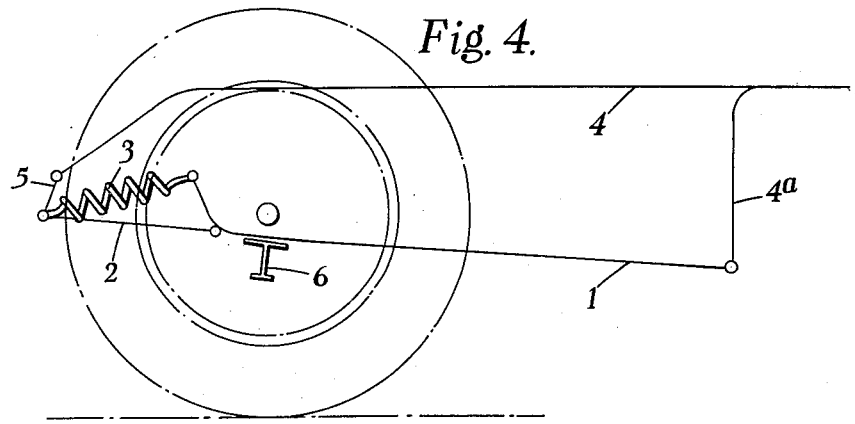
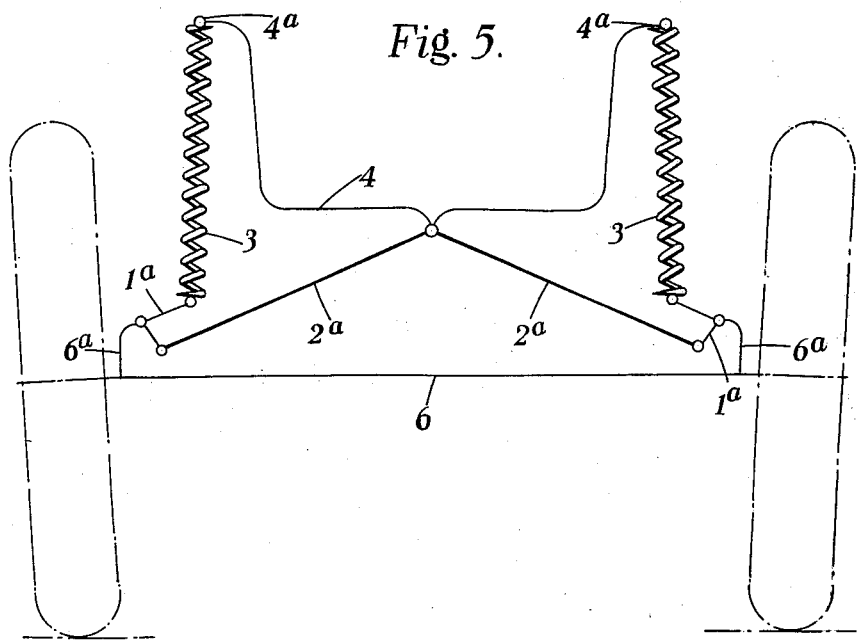
INVENTOR
Sidney A. Horstmann
BY
Ernest Wilkinson
ATTORNEY Patented Mar. 8, 1932

1,848,783

UNITED STATES PATENT OFFICE

SIDNEY ADOLPH HORSTMANN, OF BATH, ENGLAND, ASSIGNOR TO SLOW MOTION SUSPENSION LIMITED, OF BATH, ENGLAND

SUSPENSION SYSTEM FOR MOTOR CARS AND VEHICLES OF ALL KINDS

Application filed April 12, 1930, Serial No. 443,814, and in Great Britain April 22, 1929.

This specification relates to certain improvements on the invention forming the subject of our British patent application No. 37213/28.

In the above mentioned application use is made of an elastic force component and a reactionary component in the form of a pivoted lever, these two components being so arranged that as the load increases the rate of change of the load with respect to the vertical deflection of the load is of an increasing order, and such that the quotient obtained by dividing the load by the rate of change of the load with respect to such deflection is substantially constant throughout the range of deflections, or in other words the product of the load and the ratio of a small deflection to the increase of load producing it remains approximately constant.

The present application relates to certain modified arrangements by which the same result is obtained.

According to the present invention there is provided in a method of vehicle suspension a compound lever or lever and link system so related to the vehicle axle and frame and in such co-operative relationship with an elastic component that under load increments the said elastic component is compressed or extended in such a manner that as in the former invention the rate of change of the load with respect to the deflection of the system is of an increasing order and such that the quotient obtained by dividing the load by the rate of change of the load with respect to the deflection is substantially constant throughout the range of deflections.

In order that the present invention may be the more readily understood reference is made to the accompanying drawings in which:—

Figs. 1, 2 and 3 are side elevations of various forms of the present invention adapted to be applied longitudinally to the chassis. Fig. 4 shows diagrammatically an inversion of the arrangement in Fig. 2. Fig. 5 is an elevation of another modification adapted for transverse application.

In Fig. 1 use is made of two pivoted levers 1 and 2, each being pivoted to the other and either directly or indirectly to the frame 4, and an elastic compression component 3 introduced between the two levers.

The said levers are arranged longitudinally in the chassis so that the ends, remote from their common pivot, point one to the rear and the other to the front of the vehicle, and are nearly in alignment under a normal load. In order to distinguish between the ends of the pivoted levers we shall refer to them as being inner or outer according to whether we mean the ends which are pivoted together or those which are pivoted to the chassis.

In Fig. 1 the elastic component is connected between the inner end of the lever 1 and the arm 2a of the lever 2, but it may be connected to the pivot of the lever 2, the exact position being determined by the lengths of the said levers.

One or both of the outer ends of the levers is or are connected to the chassis by means of a suitable link or shackle, both outer ends being so connected in this construction by shackles 5 and 7.

The axle of the vehicle may be connected to either of the levers 1 or 2, and may be attached thereto rigidly, by swivel or by a suitable link. In this example the axle 6 is rotatably connected to the lever 1 and is considered to be attached to the frame by the propellor shaft casing which is assumed to be considerably longer than the lever 1. The shackle 7 allows the axle to follow the path determined by the propeller shaft casing.

The elastic component may be in the form of a tie or strut according to the relative positions of the parts. It is in the form of a strut or compression member in Fig. 1.

In the construction shown in Fig. 2 the lever 1 is rigidly attached to the axle 6 and pivoted at one end to a frame bracket 4a and at the other end to a member 2 whch is connected by shackle 5 to the frame.

The elastic compression member 3 is in this case interposed between the junction pin 8 and the second arm of the bell crank lever 1, so that member 2, which takes the place of the second lever in Fig. 1, is not subject to bending stresses and can therefore be in the form of a link as shown.

We may connect the elastic component between a projection at or near the inner end of the one lever and a suitable position on the link or shackle by which the outer end of the other lever is connected to the chassis.

Thus in Fig. 3 which shows an arrangement similar to that shown in Fig. 2 with the exception of the form of shackle used, the outer end of the elastic component 3 is pivoted to an extension 7a of the shackle. By this means the said elastic component is given a greater mechanical advantage over the load.

In any of the preceding arrangements, the axle may be rotatably or rigidly attached to either lever 1 or member 2; and with respect to Fig. 2 the said member 2 can be a lever or link according to whether the axle is attached to it or not.

Moreover in any of the forms of the foregoing constructions we may make use of an elastic tie or extension member instead of an elastic strut or compression member by inverting the arrangement so that the elastic component is above the inner ends of the levers instead of below; the relative positions being suitably rearranged for this purpose. Such an arrangement is shown diagrammatically in Fig. 4 which is substantially an inversion of Fig. 2, the elastic component in this instance being extended under load increments instead of compressed.

In another variation shown in Fig. 5, which is specially useful in the case of transverse springs there is pivoted at each end of the axle, or on projections 6a therefrom a lever 1a. To the end of one arm of this lever is pivoted one end of the link 2a whose other end is pivoted to a suitable point of the frame whilst one end of a spring component 3 is attached to the other arm of each lever the other end of such spring being suitably attached to a portion 4a of the frame 4. The outer ends of the two links 2a may be pivoted to the frame at a common point as shown or at different positions; and the elastic components which are here shown vertical may be at an angle to the vertical.

In all these arrangements it will be seen that as the load is increased the spring member takes up such a position that a greater compression (or extension) of the spring is caused by a given vertical displacement of the load, and further we so proportion and arrange the several parts that the expression $$\frac{dw}{W/dD}$$

remains approximately constant for all practicable variations of load, W being the load and D the vertical displacement. In the forms illustrated in Figs. 1 to 4 the parts are further so arranged that as the load increases the perpendicular from the common pivot of the parts 1 and 2 on to the line of action of the spring also increases which facilitates the attainment of this result.

In designing the arrangements necessary to produce this result in particular cases the question of the path of movement of the axle in respect to the chassis must be taken into account but a designer keeping these principles in mind would have no difficulty in proportioning and arranging his parts as to make the factor $$\frac{W/dw}{dD}$$

approximately constant for the varying range of loads. Figs. 1, 2 and 3 show three actual arrangements on a scale of one-eighth.

By our invention we are also enabled to make a spring suspension system such that not only is the periodicity approximately constant but such periodicity is also low—for ordinary vehicles the periodicity should not exceed 100 per minute and is preferably about 80. Moreover violent shocks are avoided.

For the elastic component we may use any form of elastic tie or strut and helical springs, parallel or taper or rubber may be used as the resilient member.

In any of the modifications described we may provide means for damping oscillation such as friction discs interposed between certain of the moving parts, or we may use any of the arrangements shown and described in our British patent application No. 37213/28.

What I claim is:—

1. A vehicle suspension system adapted to produce constant periodicity over a predetermined range of loads, comprising in combination a spring member in pivotal relation at one end to the vehicle frame, a two-armed lever carrying a vehicle axle, an arm pivoted to said lever and pivotally related to the frame, said lever having one arm thereof pivotally related to the frame and the other arm operating on the other end of said spring member, said latter lever arm making with the line of action of said spring member an increasing acute angle as the load increases.

2. A vehicle suspension system adapted to produce constant periodicity over a predetermined range of loads, comprising in combination a spring member in pivotal relation at one end to the vehicle frame, a two-armed lever carrying a vehicle axle, and an arm, the inner ends of said arm and said lever being pivoted together and the outer ends being pivotally related to the frame, said lever having the inner arm thereof operating on the other end of said spring member and making with the line of action of said spring member an increasing acute angle as the load increases, said lever and said arm being located so that as the load increases their common pivotal point and the pivotal points at their outer ends become further removed from a position of alignment.

3. A vehicle suspension system adapted to produce constant periodicity over a predetermined range of loads, comprising in combination a spring member, a link pivotally connecting one end of said spring member to the vehicle frame, a two-armed lever carrying a vehicle axle, an arm pivoted at one end to said lever and pivotally connected at the other end to said link, said lever having one arm thereof pivotally related to the frame and the other arm operating on the other end of said spring member, said latter lever arm making with the line of action of said spring member an increasing acute angle as the load increases.

4. A vehicle suspension system adapted to produce constant periodicity over a predetermined range of loads, comprising in combination a spring member, a two-armed lever carrying a vehicle axle, an arm pivoted at one end to said lever, and a link pivoted to the vehicle frame, the other end of said arm being pivoted to said link, said lever having one arm thereof pivotally related to the frame and the other arm operating on one end of said spring member, the other end of said spring member being pivoted to said arm, said lever arm which operates on the spring member making with the line of action of said spring member an increasing acute angle as the load increases.

5. A vehicle suspension system adapted to produce constant periodicity over a predetermined range of loads, comprising in combination a spring member in pivotal relation at one end to the vehicle frame, a two-armed lever carrying a vehicle axle, a restraining arm pivoted to said lever and pivotally related to the frame, said lever having one arm thereof connected by said restraining arm to the frame and the other arm operating on the other end of said spring member, said latter lever arm making with the line of action of said spring member an increasing acute angle as the load increases.

6. A vehicle suspension system according to claim 5 in which the spring member, the two-armed lever and the restraining arm are duplicated on opposite sides of the vehicle, and the two restraining arms are pivoted to a common point on the frame.

In testimony whereof, I affix my signature.

SIDNEY ADOLPH HORSTMANN.